United States Patent
Toncelli (10) Patent No.: US 12,097,640 B2
(45) Date of Patent: *Sep. 24, 2024

(54) PLANT AND METHOD FOR THE PRODUCTION OF SLABS FROM A MIXTURE OF AGGLOMERATE

(71) Applicant: Luca Toncelli, Bassano del Grappa (IT)

(72) Inventor: Luca Toncelli, Bassano del Grappa (IT)

( * ) Notice: Subject to any disclaimer, the term of this patent is extended or adjusted under 35 U.S.C. 154(b) by 720 days.

This patent is subject to a terminal disclaimer.

(21) Appl. No.: 16/318,851

(22) PCT Filed: Jul. 19, 2017

(86) PCT No.: PCT/IB2017/054351
§ 371 (c)(1),
(2) Date: Jan. 18, 2019

(87) PCT Pub. No.: WO2018/015893
PCT Pub. Date: Jan. 25, 2018

(65) Prior Publication Data
US 2019/0232524 A1 Aug. 1, 2019

(30) Foreign Application Priority Data
Jul. 20, 2016 (IT) .................. 102016000076304

(51) Int. Cl.
*B29C 37/00* (2006.01)
*B28B 3/00* (2006.01)
(Continued)

(52) U.S. Cl.
CPC .............. *B28B 7/364* (2013.01); *B28B 3/006* (2013.01); *B29C 37/0075* (2013.01); *B29C 67/242* (2013.01); *B29C 67/243* (2013.01)

(58) Field of Classification Search
None
See application file for complete search history.

(56) References Cited

U.S. PATENT DOCUMENTS

| 3,123,863 | A | | 3/1964 | Reilly et al. | |
|---|---|---|---|---|---|
| 3,235,438 | A | * | 2/1966 | Wisotzky | ................ B29C 53/24 428/85 |

(Continued)

FOREIGN PATENT DOCUMENTS

| EP | 0250012 A2 | | 12/1987 | | |
|---|---|---|---|---|---|
| EP | 1795321 A2 | * | 6/2007 | ........... | B29C 43/183 |

(Continued)

OTHER PUBLICATIONS

PCT International Search Report and Written Opinion dated Jul. 11, 2017 for International Application No. PCT/IB2017/054351, from which the instant application is based, 10 pgs.

*Primary Examiner* — Jacob T Minskey
*Assistant Examiner* — Caroline Beha
(74) *Attorney, Agent, or Firm* — FREDRIKSON & BYRON, P.A.

(57) ABSTRACT

A plant for the production of slabs from a mixture of agglomerate comprises a station (50) with a mixture distribution unit (52) which pours the mixture onto the inner surface of a slab forming mould (11) present in the station. The mould (11) is provided with a sheet (15) of plastic protective material arranged above the inner surface of the mould and which forms the surface for contact with the mixture which is introduced into the mould by the distribution unit (52). The station comprises air suction means which are coupled/connected to suction ducts (54) which are present in the mould and which emerge with their front end inside the mould in a zone of the mould situated between the inner surface of the mould and the sheet (15), so as to allow the suction of air between the sheet and this inner surface and bring the sheet (15) against this surface by means of a vacuum. A method for the production of slabs is also described.

23 Claims, 5 Drawing Sheets

(51) Int. Cl.
   *B28B 7/36* (2006.01)
   *B29C 67/24* (2006.01)

(56) References Cited

U.S. PATENT DOCUMENTS

| | | | | |
|---|---|---|---|---|
| 3,492,384 | A * | 1/1970 | Ford | B28B 7/08 |
| | | | | 264/71 |
| 3,658,971 | A * | 4/1972 | Schickedanz | B29C 44/30 |
| | | | | 264/46.2 |
| 4,160,003 | A | 7/1979 | Kozuka et al. | |
| 4,201,823 | A * | 5/1980 | Russell | B29C 70/025 |
| | | | | 264/101 |
| 4,331,628 | A | 5/1982 | Ziegler | |
| 4,702,877 | A | 10/1987 | Davis, Jr. | |
| 4,836,762 | A | 6/1989 | Davis, Jr. | |
| 5,173,233 | A | 12/1992 | Kafarowski | |
| 5,271,882 | A | 12/1993 | Shirahata et al. | |
| 5,536,557 | A | 7/1996 | Nasvik et al. | |
| 5,728,333 | A | 3/1998 | Tabata et al. | |
| 5,806,285 | A * | 9/1998 | Rizzieri | B29C 66/53461 |
| | | | | 53/127 |
| 5,851,560 | A * | 12/1998 | Kobayashi | B29C 45/1418 |
| | | | | 425/121 |
| 5,939,013 | A * | 8/1999 | Han | B29C 70/443 |
| | | | | 264/510 |
| 5,972,151 | A | 10/1999 | Sbrana | |
| 6,627,694 | B1 | 9/2003 | Toncelli | |
| 7,114,936 | B2 | 10/2006 | Oono et al. | |
| 10,843,377 | B2 | 11/2020 | Toncelli | |
| 2001/0023559 | A1 | 9/2001 | Ozawa et al. | |
| 2002/0167106 | A1 * | 11/2002 | Acerbi | B28B 13/04 |
| | | | | 264/109 |
| 2003/0077965 | A1 * | 4/2003 | Mack | B29C 70/24 |
| | | | | 428/297.4 |
| 2004/0040961 | A1 * | 3/2004 | Vilalta | B65D 79/02 |
| | | | | 220/212 |
| 2004/0169303 | A1 * | 9/2004 | Brutti | B28B 7/364 |
| | | | | 264/102 |
| 2008/0098689 | A1 | 5/2008 | Metten | |
| 2008/0174041 | A1 | 7/2008 | Firedman et al. | |
| 2009/0091159 | A1 * | 4/2009 | Gerish | B62D 25/20 |
| | | | | 296/193.07 |
| 2011/0041448 | A1 | 2/2011 | Ciccarello | |
| 2012/0145191 | A1 * | 6/2012 | Williams | A47L 13/17 |
| | | | | 134/6 |
| 2012/0167801 | A1 | 7/2012 | Sadler | |

FOREIGN PATENT DOCUMENTS

| | | |
|---|---|---|
| EP | 2962837 B1 | 12/2018 |
| GB | 2233640 A | 1/1991 |
| JP | S62172019 U | 7/1987 |
| JP | H01320114 A | 12/1989 |
| JP | 2546940 Y2 | 9/1997 |
| JP | 2803213 B2 | 9/1998 |
| JP | 3772242 B2 | 5/2006 |
| JP | 4676607 B2 | 4/2011 |
| JP | 5260368 B2 | 8/2013 |
| JP | 5286152 B2 | 9/2013 |
| JP | 5495287 B2 | 5/2014 |
| JP | 2014205328 A | 10/2014 |
| KR | 100169784 B1 | 3/1999 |
| KR | 20080064152 A | 7/2008 |
| KR | 20120028597 A | 3/2012 |
| KR | 101306296 B1 | 9/2013 |
| WO | 8807416 A1 | 10/1988 |
| WO | 2003/037818 A1 | 5/2003 |
| WO | 2006063940 A1 | 6/2006 |
| WO | 2016016811 A1 | 2/2016 |

* cited by examiner

PLANT AND METHOD FOR THE PRODUCTION OF SLABS FROM A MIXTURE OF AGGLOMERATE

RELATED APPLICATIONS

This application is a 35 U.S.C. 371 national stage filing from International Application No. PCT/IB2017/054351, filed Jul. 19, 2017, which claims priority to Italian Application No. 102016000076304, filed Jul. 20, 2016, the teachings of which are incorporated herein by reference.

The present invention relates to a plant and a method for forming slabs of agglomerate, for example agglomerate of stone material granules or powder bonded with a hardening resin.

In the production of slabs of agglomerate, after the material for forming the slabs has been poured into the moulds and hardened, preferably after a vacuum vibrocompression, it is necessary to separate the mould from the slab thus formed.

The moulds are preferably made in the form of flexible sheaths of elastomer material, such as synthetic rubber, and are usually composed of a bottom sheet of rubberized fabric, generally in the form of a tray with edges, and a top closing sheet of rubberized fabric. Such a mould, once filled with an agglomerate mixture, then receives from the outside a suitable vacuum vibrocompression force in order to shape the slab.

Over time a number of solutions have been developed in an attempt to prevent the hardened slabs from adhering to the mould, in particular to the bottom rubber sheet and the top rubber sheet of the elastomer mould, and to protect the rubber sheets from being attacked by the resinous binders which may contain solvents.

For example, in IT1311857 it was proposed spraying beforehand onto the surface of the rubberized sheets a fluid separating/protective agent formed essentially by a solution based on PVA (polyvinyl alcohol), before pouring the mixture into the tray.

After the separating agent has dried, a thin solid and elastic film, which adheres moderately to the surface of the rubberized sheets, is thus formed. The adhesion of the PVA film to the rubberized sheets, although weak, has the function of preventing the formation of undulations or wrinkles on the surface of the slab during the vibrocompression step. This film provides protection for the sheets of the mould from the resin and solvents, such as styrene, and also allows separation of the sheets from the hardened slab at the end of the hot catalysis process.

This occurs both for the bottom rubberized sheet onto which the mixture is poured and for the top rubberized sheet which covers the mixture.

The PVA film instead adheres firmly to the hardened slab and is extracted from the mould together with the slab. During the subsequent processes for wet sizing and polishing the slab the film is then dissolved by the process water and evacuated together with the wet processing sludges.

This solution, although effective, has a number of drawbacks associated with the fact that the protective/separating agent is fluid so that it must be applied, normally by means of spraying, and then dried.

In order to obtain a sufficiently compact layer normally a relatively high quantity of fluid, for example about 200 g/m$^2$, is applied so as to obtain, after drying, a film of about 30 to 40 g/m$^2$.

There is, however, the real risk that the agent may be sprayed not uniformly over the entire mould or that bubbles or empty pockets may be formed, these, after drying, producing pores in the film with the risk that solvents may pass through and consequently damage the elastomer mould.

It has also been proposed spraying the fluid agent at a relatively high temperature (for example about 50° C.) in order to ensure a sufficient fluidity, with the risk, however, that the water present in it may evaporate excessively during application, with the consequent loss of the fluid characteristics which are required for a correct application of the layer.

It is however also necessary to clean regularly the nozzles, an operation which is by no means simple in view of the sticky nature of the solution, in order to ensure uniform spraying of the layer.

Moreover, the large amount of solution which is needed for spraying requires time and attention during drying in order to eliminate all the considerable quantity of water in the solution, while keeping at the same time the thickness of the sprayed layer sufficiently uniform.

Finally, it should be considered that, after spraying, drying of the PVA solution must be performed in suitable drying ovens in order to obtain sufficiently rapid drying before being able to pour the mixture into the mould. Oven-drying is, however, a delicate process which must be carried out carefully in order to prevent boiling and/or the formation of bubbles and pitting.

Moreover, the presence of ovens results in an increase in the overall dimensions and costs of the plant and a substantial increase in the amount of electric energy used during the process. The oven accelerates the drying process, but complete drying nevertheless requires a certain amount of time.

For these reasons other solutions have been developed, these envisaging protecting the mould using solid sheets of suitable material which are placed directly on the bottom and on the walls of the bottom mould before pouring in the mixture, and also on the surface of the top sheet which covers the mixture.

The sheet must be chosen so as to have the necessary characteristics for use in the mould as a means for protecting and facilitating separation of the mould from the slab. For example it must be impermeable to organic vapors, in particular styrene, impermeable to the liquid resin, resistant to the catalysis temperatures of the resin, and resistant in hot conditions to solvents and chemical vapors which are developed during the slab reduction process.

Sheets, normally of plastic material (polypropylene or polyethylene terephthalate or PVA), have therefore been devised; these being combined when necessary with a sheet of paper having an overall gram weight of about 40 to 450 g/m$^2$.

After hardening of the layer of mixture, the hardened slab thus obtained is extracted from the mould together with the sheet which remains attached thereto. The sheet must then be removed from the slab.

Optionally, the sheet may also remain attached to the mould, from which it must then be mechanically removed.

If it is made of PVA, the sheet may be simply dissolved in water at room temperature; otherwise it must be removed and eliminated in solid form, being mechanically removed from the slab, or also from the mould.

US2004/169303 describes an example of use of a sheet of water-soluble plastic material.

This procedure is also effective but has the drawback that the protective sheet, since it simply rests on and does not adhere to the rubberized sheets, may form undulations or wrinkles or folds which penetrate into the layer of mixture during vibrocompression of the mixture inside the mould and then remain within the hardened slab.

During sizing and polishing of the slabs it is therefore necessary to mechanically remove any trace of paper or plastic film which has penetrated into the slab. It is clear that, owing to the paper and/or plastic film which has penetrated into the mixture, an overlayer of material, which in some cases may also be quite thick, must be removed. Even in the case of PVA which dissolves in water, it is nevertheless necessary to remove a layer of material of the slab sufficient to ensure disappearance of the defects which have arisen in the slab following trapping of the sheet inside the mixture.

This requires, therefore, on the one hand the production of slabs which are thicker in order to obtain a suitable extra thickness to be removed, and on the other hand, subsequent sizing allowing for a greater machining depth so that the paper and/or the PVA or polypropylene or polyethylene terephthalate trapped in the slab may be removed, in order to avoid the consequent defects.

If this procedure is not adopted, it will be required to deal with low-quality slabs.

The general object of the present invention is to provide a plant and a method for the production of slabs of agglomerate which are able to overcome, among other things, the aforementioned drawbacks of the prior art and which allow slabs of satisfactory quality to be obtained rapidly.

In view of this object the idea which has occurred is to provide, according to the invention, a plant as claimed in Claim 1 for the production of slabs from a mixture of agglomerate. The plant comprises a station with a unit for distributing mixture and at least one mould, the distribution unit pouring the mixture into an impression of the mould, the mould being provided with an elastic sheet of plastic protective material arranged above the said impression and forming the surface for contact with the mixture which is poured into the mould by the distribution unit. The plant comprises air suction means which are connected to suction ducts that are present in the mould and emerge with their front ends inside a zone of the mould situated between a surface of the mould impression and the sheet, so as to allow suction of the air between the sheet and this surface of the impression and bring the sheet against this surface of the impression by means of a vacuum.

Still according to the invention the idea which has also occurred is to provide a method as claimed in Claim 12 for the production of slabs from a mixture of agglomerate. The method comprises the steps of providing a mould with an impression for forming the slab, laying an elastic sheet of plastic protective material over said impression so as to realize with the sheet a contact surface for the mixture which is to be poured into the mould, sucking the air between the sheet and a surface of the mould impression so as to bring the sheet against this surface of the impression by means of a vacuum, and pouring the mixture into the mould.

In order to illustrate more clearly the innovative principles of the present invention and its advantages compared to the prior art, possible examples of embodiments applying these principles will be described below with the aid of the accompanying drawings. In the drawings.

Figure 1:
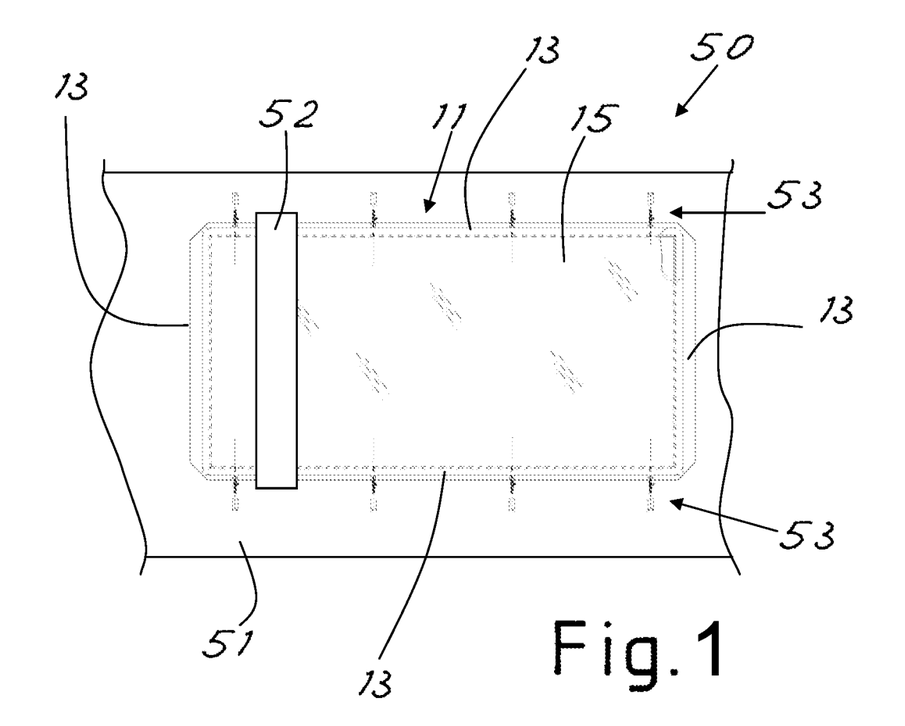
FIG. 1 shows a schematic plan view of a processing station of a plant according to the invention.
Figure 2:
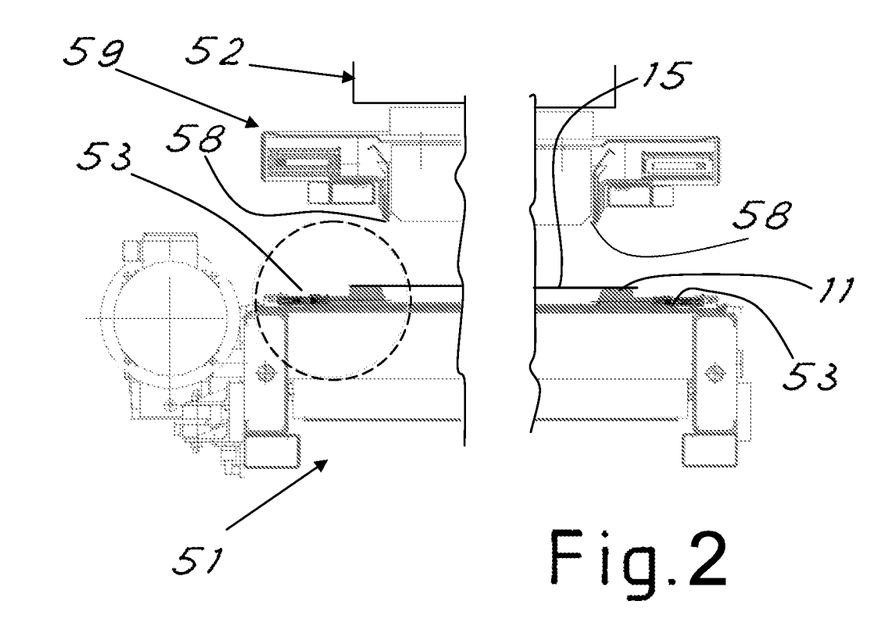
FIG. 2 shows a schematic partial view of a cross-section of the station according to FIG. 1.

With reference to the figures, FIGS. 1 and 2 show in schematic form a plant for the production of slabs according to the invention, which comprises a station, denoted generically by 50, which performs filling of a mould 11 with the mixture for formation of the slab. This station comprises a mixture distribution unit 52, known per se, for pouring the mixture into an impression 10 of the slab forming mould 11 which is present in the station, for example conveyed therein by transportation means 51 (for example, a known conveyor belt). Here the term "impression" is understood as referring to the cavity in the mould which receives the mixture and which is therefore defined within the peripheral edge of the mould by the internal surface of the said mould.

The mixture is generally poured into the mould by means of a longitudinal relative movement of the mould and distribution unit 52, with the distribution unit extending transversely over the whole width of the mould. The distribution unit and the relative movement with respect to the mould are known per se and will therefore not be illustrated or described here further, being able to be easily imagined by the person skilled in the art.

Preferably, it is the unit 52 which moves along the mould, which is kept stationary inside the station 50. However a movement of the mould underneath the unit 52 which remains stationary, or a combined movement of the mould and unit, may also be used if desired.

The distribution will be advantageously performed by means of a known action of "loosening" the mixture, so as to the level the free surface of the mixture inside the mould. The station 50 may therefore in this case also be called a "loosening station".

As can be clearly seen also in FIG. 2, the mould is initially provided with a thin elastic sheet of plastic protective material 15 arranged above the rim of the mould and which forms the surface for contact with the mixture which is introduced into the mould by the distribution unit.

Before pouring the mixture a step involving flattening or stretching of the sheet which is arranged on the mould is performed. For this purpose suction of the air trapped between sheet and mould is performed so that the sheet stretches and assumes the form of the inner surface of the mould, adhering thereto.

In particular, as can be clearly seen in FIGS. 1 and 2, the station 50 comprises advantageously air suction means 53 which are connected to suction ducts 54 which are present in the mould 11 and which emerge with a front end thereof inside a zone of the mould situated between a surface of the mould impression (generally the bottom) and the sheet, so as to allow suction of the air between the sheet and the surface of the impression and bring the sheet, which is made sufficiently elastic, against the surface of the impression by means of a vacuum.

As will become clear below, preferably the sheet of plastic protective material is secured to a perimetral edge 13 of the mould which surrounds the said impression or inner surface of the mould. Securing may be performed by means of mechanical means, for example a suitable pressing frame applied on top of the mould, but preferably a suitable adhesive may be used, being distributed between the top part of the perimetral edge and the sheet.

Advantageously, the sheet is tensioned above and at a distance from the inner surface of the mould and not placed on it, as can be clearly seen for example in FIG. 2.

The sheet of plastic protective material may be advantageously made of PVA and may be secured to the top edge of the mould with a layer of adhesive advantageously realized in the form of a layer of a fluid agent containing PVA in an aqueous solution, such that it may be uniformly combined with the film.

The mould 11 may be advantageously a mould made of flexible, preferably polymeric material, such as synthetic rubber, also of the silicone type, and be completed by a top lid part (known per se and therefore not shown). Also strengthening layers made of substantially non-stretch cloth or fabric material (not shown) may be provided on the outer surfaces, inner surfaces or inside the material forming the mould.

The bottom part of the mould 11 is preferably realized in the form of a tray, namely with raised peripheral edges 13, suitable for receiving the mixture for forming a slab.

The mixture may be an agglomerate mixture, for example an agglomerate of stone material granules or powder bonded with a hardening resin.

The top lid part is usually substantially flat or slightly shaped. Advantageously, the mould may be generally of the type used for forming the slabs by means of a vacuum vibrocompression, i.e. once the mixture has been poured in and closed by a suitable lid (not shown) it is conveyed to a compacting station where it undergoes a vacuum compression action with simultaneous application of a vibratory movement. Then, the compacted mixture is transferred to a station for hardening the resin, preferably with application of heat.

This type of mould is usually indicated by the technical term "sheath".

The PVA solution, if used as adhesive layer 14, may be advantageously formed by PVA in an aqueous solution. It is also possible to envisage, preferably, the addition of glycerin. This solution may be formed, for example (referring to the percentage weight) by about 1% to about 25% of PVA, by about 62% to about 95% of water and by about 1% to about 10% of glycerin.

Additives, such as known anti-foam, leveling and precipitating additives, may also be used.

For example, the following compositions were tested (values expressed as percentage by weight):

a thin uniform layer of fluid. Application may be performed for example by means of rolling or sponging.

In the case of PVA, the average quantity of fluid agent applied may be preferably between 2 and 10 g/m$^2$, preferably between 4 and 6 g/m$^2$.

This ensures a sufficient uniformity of coverage without using an excessive amount of fluid agent, which must have a small thickness (preferably less than 10 μm) in order to ensure a reasonable adhesion of the solid PVA film to the surface of the mould and at the same time avoid the risk of solubilizing and damaging the said film.

In fact, the very small quantity of water-based fluid agent forms an adhesive and results in partial limited dissolving of the surface of the solid PVA film, allowing the necessary adhesion thereof to the underlying surface of the rubberized mould. The small quantity of water is incorporated within the film structure.

The quantity of fluid agent is in any case sufficiently small to avoid complete dissolution of the PVA film.

The fluid layer is thus incorporated within the structure of the PVA-based sheet and therefore does not have a negative effect on the latter, but only ensures the desired adhesion thereof to the mould.

It should also be noted that the use of a fluid adhesive agent consisting of a PVA solution allows application to be performed in very small quantities, without the risk of leaving "patchy zones', namely zones which are not suitably covered by the fluid.

The layer of adhesive agent ensures that the sheet adheres sufficiently to the mould, but at the same time allows subsequent easy removal of the slab from the mould.

Advantageously, using a PVA solution and a PVA-based sheet offers the advantage that they may be subsequently completely removed from the slab simply by means of washing with water (also during the normal mechanical slab wet-finishing and polishing operations).

Instead the need for a rigorous mechanical scouring operation is avoided since adhesion of the sheet to the mould, as occurs in accordance with the principles of the invention, ensures that there is no formation of wrinkles or folds which may be incorporated in the mixture forming the slab.

However, application by means of spraying, even though difficult to perform in view of the very small thickness, is also possible.

The PVA-based sheet may be realized in the form of a solid film, for example with a thickness of between 30 and 50 μm and, preferably, around 40 μm.

| Substance | Comp. 1 | Comp. 2 | Comp. 3 | Comp. 4 | Comp. 5 | Comp. 6 | Comp. 7 |
|---|---|---|---|---|---|---|---|
| H2O | 79 | 66.8 | 90.8 | 86.1 | 62.1 | 95.1 | 71.1 |
| PVA | 12.8 | 25 | 1 | 1 | 25 | 1 | 25 |
| Glycerin | 5.3 | 5.3 | 5.3 | 10 | 10 | 1 | 1 |
| Additives | 2.9 | 2.9 | 2.9 | 2.9 | 2.9 | 2.9 | 2.9 |
| TOTAL | 100 | 100 | 100 | 100 | 100 | 100 | 100 |

Composition 1 is the composition which is preferred, even though compositions 2-7 may be used in accordance with the principles of the invention. Other compositions may however be used.

It has been found to be particularly advantageous if the layer of fluid agent is applied onto the mould surface by means of mechanical contact of an applicator element soaked with said fluid agent against the surface of the mould. This ensures the application and the consequent formation of This sheet may advantageously have a gram weight of between 20 g/m$^2$ and 60 g/m$^2$ and preferably between 30 g/m$^2$ and 50 g/m$^2$.

The suction means may be arranged in the station 50 along a peripheral edges of the mould so as to link up (connect) with suitable suction ducts present in the said mould (ducts which have for example a diameter of about 6-10 mm) and which connect the internal cavity of the mould underneath the sheet 15 to the exterior of the mould.

Advantageously, the edges of the mould acted on by the suction means may be the two opposite longitudinal edges so that the mould may be arranged between the suction means 53 by means of the same transportation movement which brings the mould inside the station 50.

The passages inside the mould and the associated suction means may be advantageously distributed at intervals along the edges of the mould, as is clearly visible in FIG. 1, so as to suck uniformly the air trapped underneath the sheet applied to the mould. For example, the suction means may be formed by four connectors on one side and four connectors on the opposite side of the mould.

Again advantageously, the bottom of the mould may have preferably a surface which is not smooth so as to allow a better evacuation of the air between the bottom of the mould and the solid film. In order to achieve this, the inner surface of the mould on which the mixture is deposited with the sheet in between, instead of having a smooth rubber face, may be at least partially formed with a suitable surface roughness, this being achieved for example by using preferably a surface cloth or rubber with a superficial knurling or the like.

Owing to the roughness of the internal surface of the mould (in particular on the bottom of the mould impression) micro-channels for passage of the air are created, these allowing the air to be sucked not only close to the perimetral edge of the mould, but also into the centre of the mould (or tray) such that the solid film rests perfectly over the whole of the bottom of the tray without causing any puckering.

Moreover, in this case, if the internal surface of the mould is made of cloth, the film adheres better to the bottom of the tray since the cloth has better gripping properties than the rubber.

Figure 3:
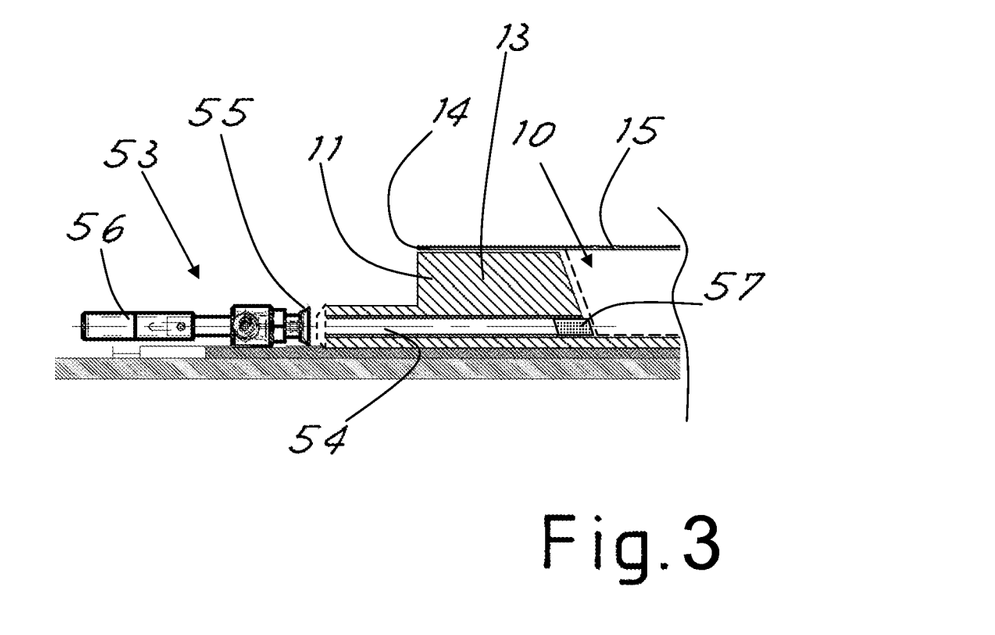
FIG. 3 shows a schematic view, on a larger scale, of a detail shown in FIG. 2.

FIG. 3 shows an enlarged view of an advantageous embodiment of the suction means (in the zone indicated by a broken line circle in FIG. 2) which are designed so that they may be automatically and controllably engaged with the aforementioned suction ducts present in the mould.

As can be seen in FIG. 3, the suction ducts (indicated generally by 54) preferably extend so as to emerge laterally inside the internal cavity of the mould, close to the bottom, so as to allow correct air suction even when the sheet starts to move towards the bottom of the mould.

Again in FIG. 3 it can be seen how the suction means 53 may comprise for each duct 54 a sealed connecting end 55 (for example in the form of a suction cup) which, by means of a suitable actuator 56 (for example a pneumatic actuator), is pushed against the end of the duct 54 which emerges outside the mould.

Advantageously, the actuator 56 moves the sealed connecting end 55 horizontally between a retracted position, shown in solid lines in FIG. 3, and an advanced operative position, shown in broken lines in FIG. 3, so as to form a seal against the outer end of the duct 54.

The connecting end 55 is in turn connected to a controlled vacuum source or vacuum plant (not shown) so as to suck the air into the internal cavity of the mould through the duct 54. Advantageously, the end of the duct 54 which emerges inside the mould is provided with a suitable filter 57 which allows the air to pass through, but prevents for example the sheet 50 from being sucked into the duct 54.

During operation of the plant, when a mould (prepared with the sheet above the impression in accordance with that described with reference to FIGS. 1 and 2) reaches the station 50, the suction means 53 are operated so as to be connected to the ducts 54 present in the mould and to suck the air between the bottom of the mould (for example in the form of a tray) and the sheet or the solid film 15 applied to the edge of the mould.

Consequently, a solid film owing to its elasticity, stretches and rests against the surface of the inner rim and the bottom of the mould, assuming its final form, as shown in broken lines in FIG. 3.

The suction time needed for the solid film to be perfectly arranged against the inner surface of the mould may be reduced to only a few seconds. However, for more reliable results, suction may be maintained for a longer period of time before pouring the mixture. Moreover, suction may be maintained also during the entire mixture distribution and loosening operation so as to ensure that the sheet 15 remains stable against the bottom of the mould.

Owing to suction, the sheet remains perfectly adherent to the mould.

Once the mixture has been poured the air suction may be interrupted since the film previously shaped by suction retains its form adhering to the surface of the mould since it is acted on by the weight of the mixture distributed over it.

Figure 4:
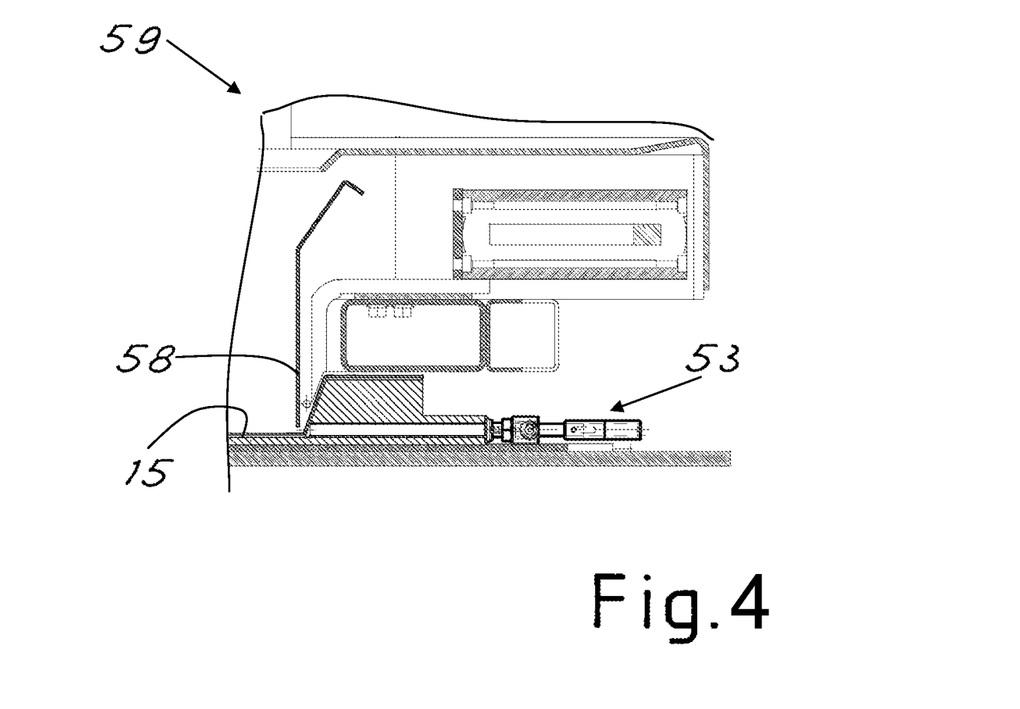
FIG. 4 shows an enlarged schematic view of a detail of the station shown in FIG. 2 in a different operating position.

The station 50 may also preferably comprise a peripheral profile 58 for containing the mixture, which is lowered via suitable drive means (not shown) by a frame 59 and placed on the bottom of the tray in the vicinity of its peripheral edge before the mixture is poured. The profile is shown for example in the raised position in FIG. 2 and in the lowered position inside the mould in the enlarged view of FIG. 4.

The function of the peripheral profile is to help contain the mixture when it is distributed inside the tray and prevent part of it from accidentally spilling outside of the tray.

Once the containing profile has been lowered, with suction of the air still active, the mixture is distributed inside the tray. Once distribution of the mixture has been completed, the peripheral containing profile may be raised again and the mould, disconnected from the suction means, may be conveyed away for the subsequent slab production steps.

In any case, once the mould has been filled with the mixture, it may be closed at the top by the appropriate lid, advantageously also protected beforehand with a plastic protective sheet (for example a PVA sheet or film). For example, a special station (substantially known per se and therefore not shown) may pick up the lid, turn it over and deposit it on top of the mixture contained inside the tray.

The tray thus closed and containing the mixture may then be transferred to a forming station (also per se substantially known and therefore not shown) where, preferably, a known step of vacuum vibrocompression of the mixture is performed.

The internal filters 57 present inside the ducts 54 of the mould also have the function of preventing the mixture, during vibrocompression, from being pushed inside the passages, tearing the film and/or creating protrusions which would then prevent extraction of the slab from the tray after hardening.

Then the slab is transferred into the hardening station.

At the end of the production line the lids and the trays are finally removed so as to be able to remove the hardened slab. A return line for the lids and trays may also be provided so that they may be cleaned and then used again for application of the solid film, and the mould preparation and slab production cycle repeated.

Preferably, the films remain attached to the slabs since the fluid glue used to fix the films to the lid and the tray has a limited adhesive power.

The slabs, after catalysis and hardening, may be conveyed away for removal of the sheets. These sheets may be peeled off mechanically (manually or using automatic devices) from the said slab or (if made of soluble material such as PVA) the slabs may be transferred to a wet-polishing and sizing line with the sheet still applied, where the processing water causes dissolving of the sheets which are then removed together with the processing sludges.

The flattening or stretching step of the sheet against the surface of the mould as described above has been found to be particularly advantageous in the case where a subsequent vacuum vibrocompression process is carried out because it is possible to eliminate any air bubbles present underneath the sheet would expand during the vacuum process, causing separation of the film from the sheet.

Flattening or stretching by means of a pneumatic action involving suction of the air between sheet and mould has been found to be particularly advantageous for relatively deep mould parts, such as the tray or base of the mould which receives the mixture.

Advantageously and in addition to that mentioned above, a fluid layer between sheet and at least some areas of the mould ensures an adequate moderate adhesion of the sheet 15 to the mould surface. This adhesion is useful for keeping the sheet in position and for preventing the formation of folds or wrinkles in the sheet during the subsequent processing steps, but at the same time does not hinder subsequent voluntary separation of the sheet from the mould after formation of the slab, as will become clear below.

Figure 5:
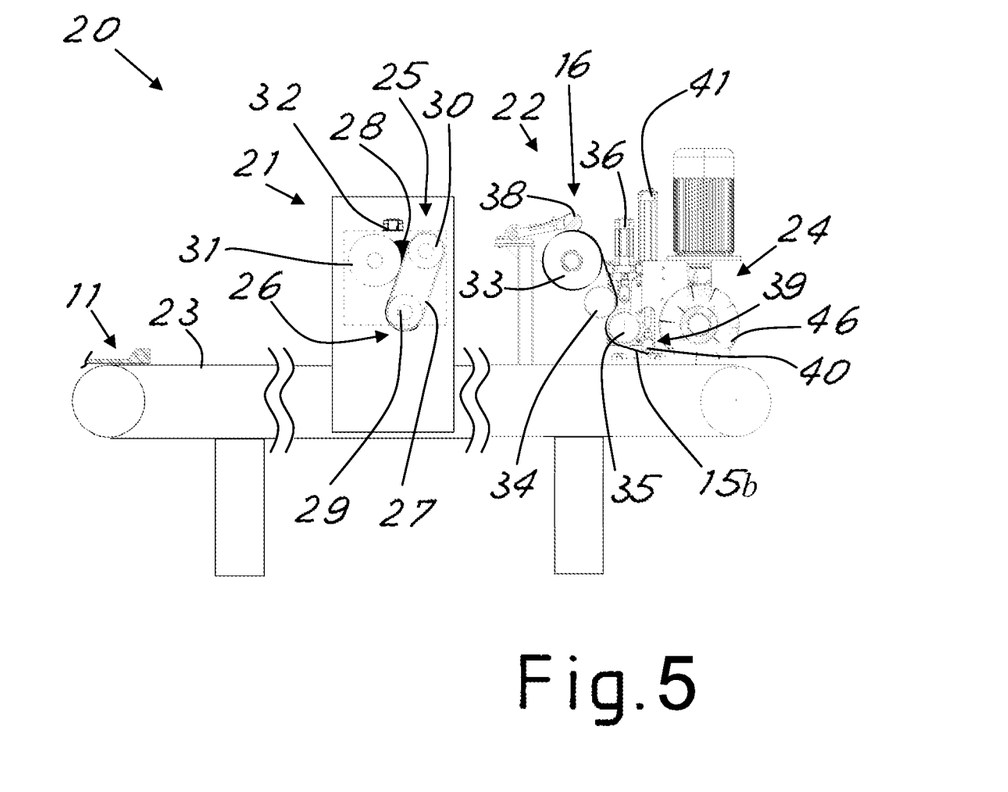
FIG. 5 shows a schematic side elevation view of a possible further plant of the plant according to the invention.

FIG. 5 shows a schematic view of another section of the plant according to the invention, found to be particularly advantageous for the automatic preparation of the mould used in the station 50.

As can been seen in FIG. 5, this plant portion (denoted generally by 20) comprises a first station 21 for applying a layer of fluid agent in the predetermined zones of the mould and a second station 22 for depositing the sheet of plastic material (preferably PVA based).

A conveyor 23 (preferably of the belt type) is advantageously arranged between the two stations, said conveyor travelling underneath and between the first and second stations and being intended to transport the mould sequentially into the two stations. Alternatively, the stations may also be designed such that they are mobile and can be displaced above the mould, instead of displacing the mould underneath the stations.

A flattening or stretching device 24, if necessary, may be arranged downstream of the sheet application zone.

The first station 21 is intended to distribute uniformity the layer of fluid agent on predetermined surfaces of the mould which passes underneath it, transported by the conveyor 23 and with the surface to be treated directed upwards. Application of the fluid agent allows the sheet to be suitably fixed to the mould for the subsequent processing operations.

Advantageously, the first station 21 may comprise an applicator element 25 which is soaked or coated with the fluid agent so as to transfer the fluid agent by means of contact onto the surface of the mould passing below it, in a fluid release zone 26.

In particular, it has been found to be advantageous if the applicator element comprises a belt 27 which travels between a zone 28 for picking up the fluid supplied by a fluid reservoir (for example from a fluid tank, not shown), where it is soaked or coated with fluid, and the fluid release zone 26. The travel movement advantageously occurs in the direction of travel of the mould underneath the station.

The belt is made with a material suitable for absorbing and/or picking up a certain quantity of fluid and conveying it to the release zone 26 where it may be transferred onto the desired areas of the mould surface with which it comes into contact.

In a possible preferred embodiment, the belt 27 is wound around two rollers 29 and 30 transverse to the movement of the mould. The first roller 29 is situated at the bottom so that the belt is wound around it in the fluid release zone 26 where the fluid comes into contact with the desired parts of the mould surface to be coated.

The second roller 30 is instead situated in a top position and preferably in such a way that the belt has at least one section between the two rollers which is inclined towards the direction of advancing movement of the conveyor 23, with an upwardly directed side which is designed to remove the fluid from the fluid reservoir. Means for transferring onto the belt the fluid to be applied to the mould are present along the advantageously inclined section, before the moving belt 27 reaches the release zone.

These means may be of various types, as may be easily imagined by the person skilled in the art For example, it has been found to be advantageous to use a third roller 31, parallel to the first two rollers, placed in contact with the upwardly directed side of the moving belt.

The three rollers and the belt obviously extend transversely with respect to the conveyor so as to be able to cover the entire width of the mould surface to be treated.

As can be seen in FIG. 5, the pick-up zone 28 where the fluid is poured is provided between the belt and the third roller. The fluid therefore accumulates between the belt and the third roller so as to be conveyed in a small amount by the belt towards the release zone 26.

The third roller 31, in order to facilitate adhesion of the fluid on the belt, is preferably arranged so as to be counter-rotating relative to the belt 27.

The belt basically operates in the manner of a stamping machine which removes the fluid and distributes it on the top surface of the perimetral edge in contact with the belt in the release zone 26.

Distribution of the fluid therefore essentially takes place by means of rolling or sponging.

The fluid application device is advantageously provided with pneumatic pistons 32 for being able to adjust the vertical position of the applicator element so as to allow, for example, the passage of raised mould parts (for example the rim 13) and so as not to contaminate, with fluid, parts which must not be coated. The device may for example be raised when a mould is not present underneath the station, so as to avoid soiling the conveyor.

Figure 6:
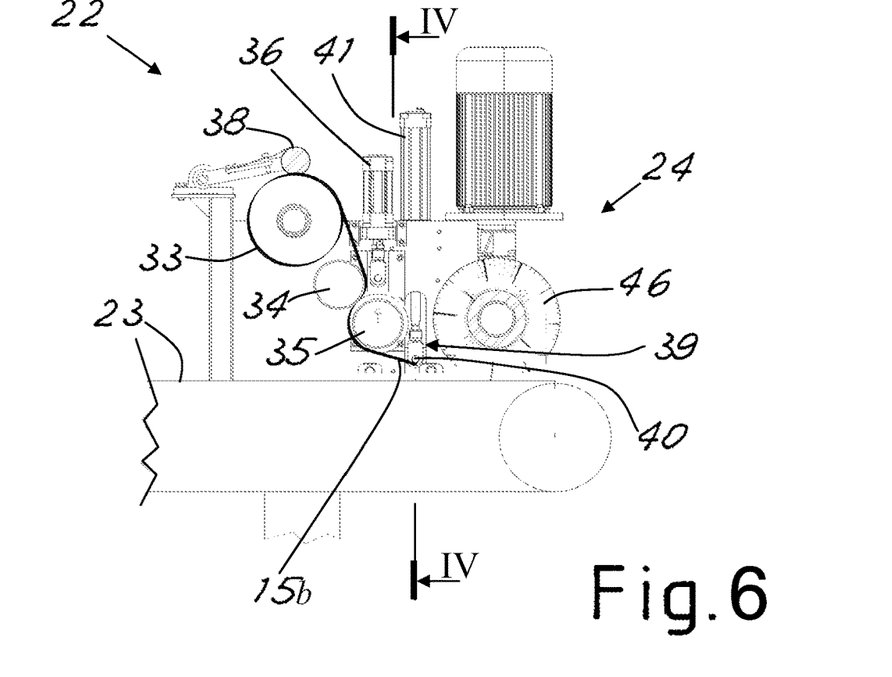
FIG. 6 shows a cross-sectional view on a larger scale of a station of the plant section shown in FIG. 5.
Figure 7:
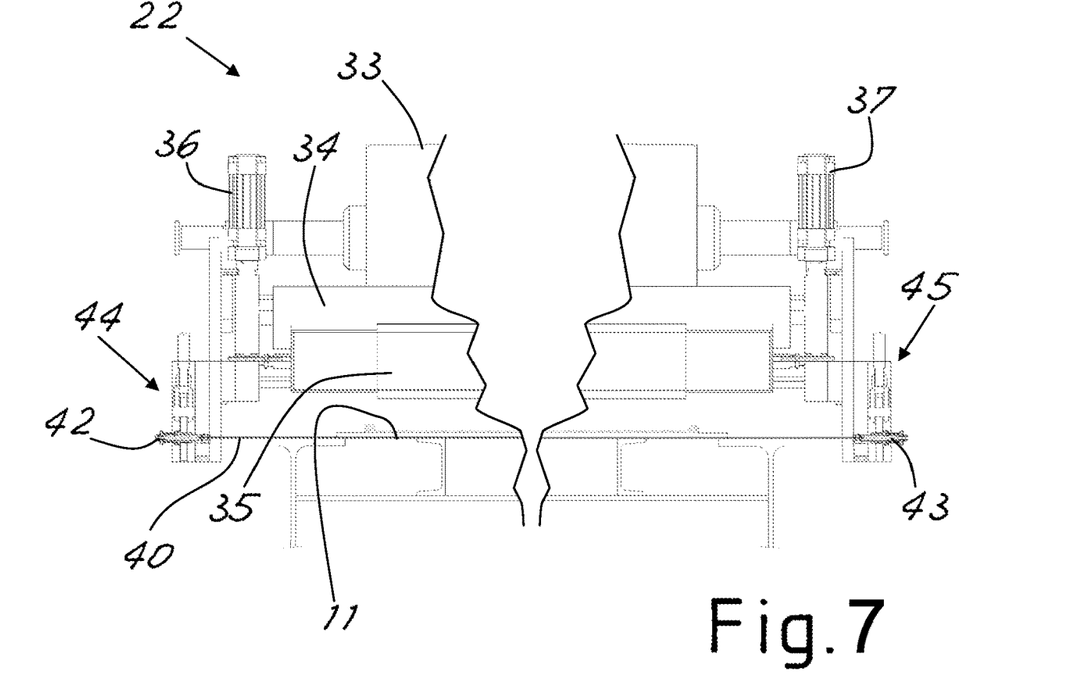
FIG. 7 shows a partial, schematic, cross-sectional view along the line IV-IV of FIG. 6.

FIGS. 6 and 7 show in greater detail the second station 22 and the flattening or stretching device 24, where present.

The second station 22 may comprise a release device which may release single sheets previously prepared to the correct length. However it has been found to be advantageous if the station 22 comprises a feeding device 16 which releases the sheet 15 in the form of a continuous strip of film (indicated by 15*b*) which is unrolled from a reel 33 with its axis transverse to the direction of movement of the mould underneath the release device and then cut to size.

Preferably, unrolling of the plastic film may be performed autonomously since the plastic film adheres to the perimetral surface of the mould on account of the adhesive fluid which has just been applied.

This ensures precise application of the film without wrinkles, due to excessively fast feeding, or rips or tears, due to slow feeding of the film.

In particular, according to a possible structure of the plastic film feeder device, the plastic film 15*b* unrolled from the reel 33 passes from one or more transmission rollers 34 over which the film passes and then from a final roller 35 which has the function of stretching the plastic film over the surface of the mould with which it is in contact.

At least the final roller 35 is movable vertically so as to be able to be moved towards or away from the underlying conveyor 23 so as to, respectively, press the film with suitable force against the surface to be covered and/or allow the peripheral rim of the trays to pass underneath, as will be explained more fully below.

In order to perform this vertical movement a pair of pneumatic pistons 36, 37 are provided, as can be clearly seen in FIG. 7.

Advantageously, above the reel 33 of plastic film there may be a further roller 38, which is preferably soft and may be of the brush type, said roller being elastically pushed against the periphery of the reel 33 and having the function of smoothing the plastic film, if necessary, in order to prevent or reduce subsequent trapping of air bubbles between sheet and deposition surface inside the mould and prevent wrinkling of the sheet before it is applied onto the mould. The roller 38 may also prevent uncontrolled unrolling of the reel, maintaining a correct tension of the film between the reel and the following rollers 34 and 35.

In order to perform cutting to size of the strip of film so as to form the sheet on the mould, advantageously a cutting device 39 is provided, said device being arranged transverse to the strip of unrolled film and being advantageously situated downstream of the roller 35.

In particular, it has been found to be advantageous to provide the cutting device 39 with a wire 40 heated to the temperature needed to melt the material of the film and arranged transverse to the direction of feeding of the mould. Motor-driven means 41 (for example one or more pneumatic pistons) controllably move the wire 40 between a non-operative raised position, where it does not interfere with the plastic film, and an operative, lowered, cutting position where the wire is arranged against the plastic film. As can be seen in FIG. 7, the wire is advantageously supported and tensioned between its two ends 42, 43 which are situated on the sides of the conveyor 23 and on which the motor-driven means 41 act via connections and crank arrangements 44 and 45. The movement of the wire between its two—non-operative and operative—positions may be vertical so as to be lowered onto the plastic film once the film has been deposited on the mould.

Advantageously the wire is metallic and heated by means of the Joule effect via an electric current which flows in it as a result of an electric power supply (not shown) connected to its two ends 42 and 43.

As can be clearly seen again in FIG. 6, the optional flattening or stretching device 24 comprises preferably a pressure roller 46 with its axis of rotation which is transverse to the direction of movement of the conveyor and which is pushed towards the conveyor so as to act on the sheet deposited on the mould surface and press it against the mould surface when the mould passes underneath it. This pushing action may be obtained, for example, by means of suitable elastic supporting of the roller, the weight itself of the roller, elasticity of the peripheral surface of the roller, or a combination of these three characteristics.

The roller may, for example, be made with a peripheral surface which is soft and compressible or in the form of a brush.

When using the plant, the mould part to be treated is moved on the conveyor 23 with the side to be treated directed upwards, as shown schematically in FIG. 5. As already mentioned, the figures relating to the plant show for the sake of simplicity the bottom mould part or tray 11. A similar treatment may be applied to the top part or lid 12 of the mould which must then enclose the mixture inside the mould.

Initially both the station 21 for applying the layer of fluid agent and second station 22 for depositing the sheet of plastic material are in their rest position, namely respectively have the fluid applicator element 25 and the plastic film feeder device which are raised.

When the front end of the mould (front end and tail end are understood as being in relation to the movement of the mould along the plant) reaches the first station 21, the fluid applicator element 25 is lowered so that it comes into contact with the surface of the mould to be treated with the fluid.

For a better efficiency of the vacuum flattening or stretching action it has been found to be advantageous to apply the adhesive fluid only on top perimetral zones of the mould.

Figure 8:
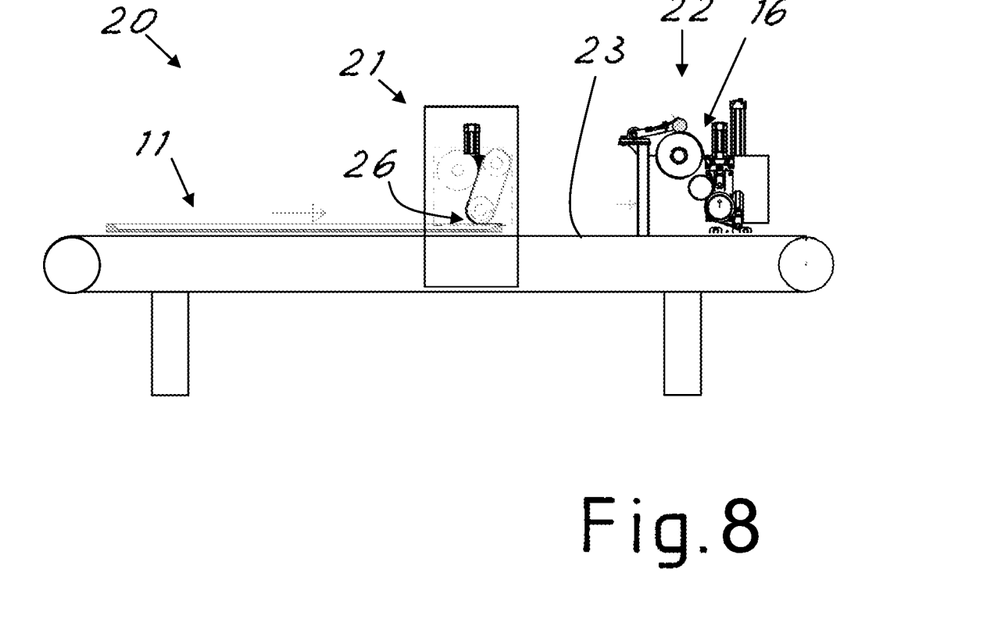
FIGS. 8 and 9 show possible operative steps of the plant section shown in FIGS. 5, 6 and 7.

This application is shown by way of example in FIG. 8 where the first station 21 is used for application a layer of adhesive fluid agent and the second station 22 is used for deposition of the sheet of plastic material.

According to this application, when the front part of the mould reaches the first station 21, the fluid applicator element 25 is lowered so as to come into contact with only the peripheral edge or rim of the mould. In this way, in the first working station, the adhesive (which is for example PVA-based) is distributed only on the perimetral edge of the mould (for example the tray).

Figure 9:
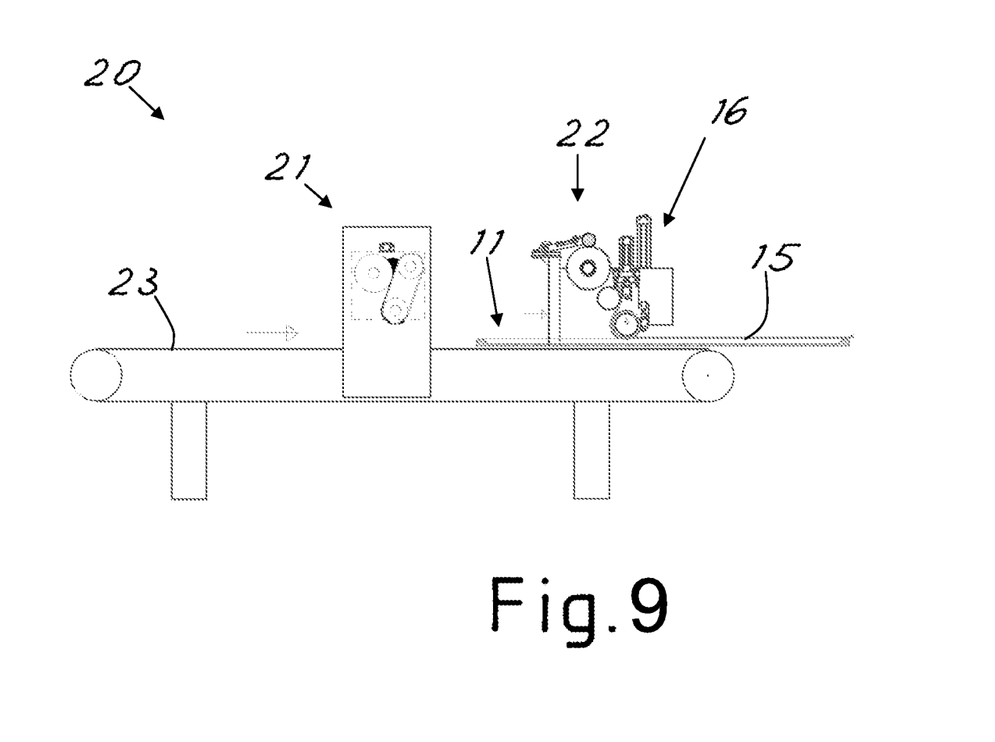

As can be clearly seen in FIG. 9, the mould thus treated then passes to the sheet deposition station 22, where the sheet is stretched over the mould so as to adhere to the peripheral rim of the mould treated with the adhesive fluid. In this way, the sheet is arranged horizontal and spaced from the bottom of the mould and, owing to the adhesive and its lightness, remains perfectly in position (like the skin of a drum) over the mould impression.

Basically, ultimately, the plastic film will rest and will be glued onto the perimetral edge of the mould and will be suspended and spaced in relation to the bottom thereof.

In the station 22 the optional flattening or stretching device 24 is therefore not used (and may therefore also not be present, as is clear from FIG. 9).

In particular, the mould 11 with the sheet applied may pass to the station 50 (for example transported by the aforementioned conveyor which reaches the station). In the station 50 the aforementioned operation of vacuum flattening or stretching of the mould and filling with the mixture will be then performed.

At this point it is clear how the predefined objects have been achieved. Owing to the principles of the invention, the surfaces of the mould are suitably protected, the slab produced may be easily separated from the mould, and sufficient adhesion of the protective sheet to the mould during preparation and use of the mould are ensured. Obviously the description provided above of embodiments applying the innovative principles of the present invention is provided by way of example of these innovative principles and must therefore not be regarded as limiting the scope of the rights claimed herein.

For example, depending on the length of the moulds and the distance between the stations, the steps for applying the fluid layer and depositing the solid sheet may be completely separated temporally or partially overlapped, in the sense that, while the fluid application station is operating on the rear part of the mould, the sheet deposition station is already operating on the front part of the mould.

In any case, once deposition and any flattening or stretching has been completed, the mould may leave the preparation plant and continue towards the following slab production steps, also after a temporary storage step.

As mentioned above, after preparation of the mould with the protective sheet, and vacuum flattening, the following steps may preferably comprise: distribution of the mixture of agglomerate forming a slab in the mould and, if necessary, closing of the latter with the lid; formation of the slab; the slab hardening process; extraction of the slab from the mould together with the sheet or sheets; and elimination of the sheet from the slab.

The forming process may in turn comprise a known procedure for compaction by means of vibrocompression, optionally under a vacuum, and subsequent hot hardening of the mixture.

Elimination of the sheet may be performed mechanically and/or by means of dissolving of the sheet in water (for example during the mechanical process for finishing the slab surfaces which generally involves wet-polishing and sizing).

All these subsequent processing steps are not shown or described here in greater detail, since they are known per se and may be easily imagined by the person skilled in the art in the light of the description provided here.

Moreover, owing to the presence of adhesive fluid only on the edge of the mould, the sheet may be easily removed.

Owing to the principles of the invention rubber trays may be used, with all the associated advantages, and there is the guarantee that parts or traces of the protective sheet do not remain trapped in the slab, even if the mixture undergoes vibrocompression.

During sizing and smoothing of the hardened slab, the extra layer of material to be removed will therefore be of a reduced amount.

As a result the thickness of the layer of mixture to be distributed inside the tray may be reduced and, therefore, the quantity of mixture strictly needed for each slab may be used. There is also a reduction in the energy costs and the cost of the tools needed for processing of the slab, as well as a reduction in the amount of processing sludges. Although the application of the fluid by means of contact, in particular using a device with an applicator element as described above, has been found to be preferable, in order to obtain more uniform release of the fluid layer and greater control over its small thickness, the first station 21 for applying the fluid agent layer may also alternatively comprise suitable nozzles located in the fluid release zone for spraying the fluid directly towards the surface of the mould passing through this zone. Moreover, other known contact application elements and devices may be used.

The application of the fluid between mould and sheet and application of the sheet may also be performed in time intervals and spaces much closer together compared to that shown and described. For example, the fluid may be applied directly in the sheet deposition station, immediately before the sheet touches the mould surface to which it must adhere, so as to be arranged between the sheet and the mould surface, and not necessarily be spread beforehand over the mould surface.

The form, dimensions and proportions of the various parts of the mould and the plant may vary with respect to those shown here, depending on the specific requirements. Moreover, the plant may comprise known accessory elements for management thereof, synchronization of the operations, detection of the passage of the mould parts for activation of the various mechanisms, etc.

In order to protect very wide moulds, two or more rolls of solid film arranged in parallel may also be used, so that the film of each roll covers only a part of the surface of the mould. This could be useful for example in the case where slabs of considerable width must be produced.

The invention claimed is:

1. Plant for production of slabs from a mixture of agglomerate, comprising a station with a unit for distributing the mixture and at least one mould, the distribution unit configured for pouring the mixture into an impression of the mould, the mould being provided with an elastic sheet of plastic protective material arranged above the said impression and forming the surface for contact with the mixture which is poured into the mould by the distribution unit, wherein the plant comprises air suction means which are connected to suction ducts that are present in the mould and emerge with their front end inside a zone of the mould situated between a surface of the mould impression and the sheet, so as to allow suction of the air between the sheet and said surface of the impression and bring the sheet against said surface of the impression by means of a vacuum, wherein said sheet of plastic protective material is secured to a peripheral edge of the mould surrounding said mould impression and in that the sheet of plastic protective material is secured to the peripheral edge of the mould by means of an adhesive layer, and wherein the plant comprises, in sequence, upstream of the station with the mixture distribution unit, a first station for application of the adhesive layer on the peripheral edge of the mould and a second station for deposition of the sheet of plastic protective material.

2. The plant according to claim 1, characterized in that the sheet of plastic protective material is made of PVA and the adhesive layer is a layer of a fluid agent containing PVA in solution.

3. The plant according to claim 1, characterized in that the first station comprises an applicator element soaked or coated with said adhesive so as to transfer the adhesive by means of contact onto a mould surface that passes through a zone where the adhesive is released by the applicator element.

4. The plant according to claim 3, characterized in that the applicator element comprises a belt running between an adhesive pick-up zone, so as to be soaked or coated with the adhesive, and the adhesive release zone.

5. The plant according to claim 1, characterized in that the second station comprises a device for releasing the sheet in the form of a strip of film which is unrolled from a reel and a device for transversely cutting the strip of film so as to form the sheet.

6. The plant according to claim 1, characterized in that the suction means are movable controllably between an inoperative position and an operative position for connection to the suction ducts present in the mould.

7. The plant according to claim 6, characterized in that the suction means comprise, for each suction duct, a sealed connecting end which, in the operative position, is pressed against one end of the corresponding suction duct which is opposite to the front end and which emerges outside the mould.

8. The plant according to claim 1, characterized in that the ducts in the mould comprise filters arranged at one end of the ducts which emerge inside the impression.

9. The plant according to claim 1, characterized in that the surface of the mould impression is at least partially made with a cloth or rubber having a knurled surface.

10. The plant according to claim 1, characterized in that the adhesive layer lacks contact with the mixture when poured into the mould by the distribution unit.

11. The plant according to claim 1, characterized in that the sheet of plastic protective material remains wholly adhered to the mould for the production.

12. The plant according to claim 1, wherein the first station and the second station are separate stations and consecutive in the sequence.

13. The plant according to claim 1, wherein the first station is only station of the plant for application of adhesive, and wherein the second station is only station of the plant for deposition of plastic material.

14. The plant according to claim 1, wherein application of the adhesive layer in the first station is directly on the peripheral edge of the mould.

15. Method for production of slabs from a mixture of agglomerate, comprising the steps of providing a mould with an impression for forming the slab, laying an elastic sheet of plastic protective material over said impression so as to realize with the sheet a surface for contact with the mixture which is to be poured into the mould, securing said sheet of plastic protective material to a perimetral edge of the mould which surrounds the said mould impression, sucking the air between the sheet and a surface of the mould impression so as to bring the sheet against this surface of the impression by means of a vacuum, and pouring the mixture into the mould, wherein the sheet is arranged above said impression with the further step of applying a layer of adhesive between the sheet and a peripheral edge of the mould around said impression, and wherein the step of applying a layer of adhesive between the sheet and the peripheral edge of the mould is performed by a first station and the step of laying the elastic sheet of plastic protective material over said impression is performed by a second station.

16. The method according to claim 15, characterized in that the air suction is interrupted only after the mixture has been poured into the mould.

17. The method according to claim 15, characterized in that the sheet of plastic protective material is made of PVA and the adhesive layer is a layer of a fluid agent containing PVA in solution.

18. The method according to claim 17, characterized in that the average amount of fluid agent applied to the peripheral edge of the mould is between 2 g/m$^2$ and 10 g/m$^2$, and/or the sheet of PVA-based plastic material has a gram weight of between 20 g/m$^2$ and 60 g/m$^2$.

19. The method according to claim 15, comprising the further steps, after the introduction of the mixture into the mould, of: —carrying out a slab forming process with a vacuum vibro-compression compaction step; —carrying out a slab hardening process so as to consolidate the slab; —extracting the slab together with the sheet from the mould; —eliminating the sheet from the slab, by means of a step involving dissolving the sheet of soluble material in water.

20. The method according to claim 16, comprising the further steps, after the introduction of the mixture into the mould, of: —carrying out a slab forming process with a vacuum vibro-compression compaction step; —carrying out a slab hardening process so as to consolidate the slab; —extracting the slab together with the sheet from the mould; —eliminating the sheet from the slab, by means of a step of involving dissolving the sheet of soluble material in water.

21. The method according to claim 15, comprising the further steps, after the introduction of the mixture into the mould, of: —carrying out a slap forming process with a vacuum vibro-compression compaction step; extracting the slab together with the sheet from the mould; —eliminating the sheet from the slab, by means of a step involving dissolving the sheet of soluble material in water.

22. The method according to claim 17, comprising the further steps, after the introduction of the mixture into the mould, of: —carrying out a slab forming process with a vacuum vibro-compression compaction step; —carrying out a slab hardening process so as to consolidate the slab; —extracting the slab together with the sheet from the mould; —eliminating the sheet from the slab, by means of a step involving dissolving the sheet of soluble material in water.

23. The method according to claim 18, comprising the further steps, after the introduction of the mixture into the mould, of: —carrying out a slab forming process with a vacuum vibro-compression compaction step; —carrying out a slab hardening process so as to consolidate the slab; —extracting the slab together with the sheet from the mould; —eliminating the sheet from the slab, by means of a step involving dissolving the sheet of soluble material in water.

* * * * *